(No Model.)

G. W. SAMPSON.
LOCKING NUT.

No. 289,146.  Patented Nov. 27, 1883.

WITNESSES:
Donn Twitchell.
C. Sedgwick

INVENTOR:
G. W. Sampson
BY Munn & Co
ATTORNEYS.

UNITED STATES PATENT OFFICE.

GENERAL W. SAMPSON, OF WASHINGTON TOWNSHIP, KEOKUK COUNTY, IOWA.

LOCKING-NUT.

SPECIFICATION forming part of Letters Patent No. 289,146, dated November 27, 1883.

Application filed April 14, 1883. (No model.)

*To all whom it may concern:*

Be it known that I, GENERAL W. SAMPSON, of Washington township, Keokuk county, and State of Iowa, have invented a new and Improved Locking-Nut, of which the following is a full, clear, and exact description.

The object of my invention is to furnish a lock and take-up nut that shall be secure against any backward movement or loosening, and which can be readily turned forward for tightening or to take up wear—as, for instance, when used on the boxes of shafts—so that the bearings can be readily kept tight.

The invention consists, broadly, in a spring-actuated dog or blocking-piece, combined with a nut for clamping upon the bolt, which may be screw-threaded or not, and in details the construction may be varied, as hereinafter described and claimed.

Reference is to be had to the accompanying drawings, forming a part of this specification, in which similar letters of reference indicate corresponding parts in all the figures.

Figures 1 to 6 are detail views, showing the various forms of construction.

A in all the figures is the nut; B, the bolt to which the nut is applied, and C the locking-dog or block, fitted in a recess, $a$, at the under side of the nut, which recess opens into the central aperture of the nut, and is formed on its outer face curved or inclined eccentric to the central aperture, so that the dog has two bearings—one against the surface of the bolt and the other upon the inclined side of the recess. The recess $a$ is extended at one side in the backward direction to receive a spring, $b$, that bears upon the dog, so as to retain it in place and assist the locking movement.

Figure 2:
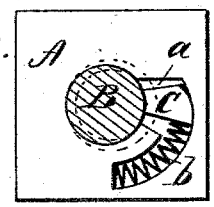
Figure 3:
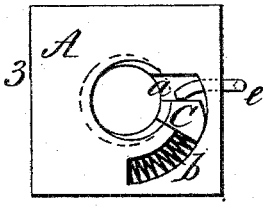

In Fig. 2, which is a cross-section, and Fig. 3, an inverted plan view, the dog C is of angular form, rounded at its ends to fit the bottom of the recess and the bolt, and locks by an oscillating or rocking movement. The inner end is also formed with thread-sections to fit the thread of the bolt, so as to avoid injury to the thread.

Figure 1:
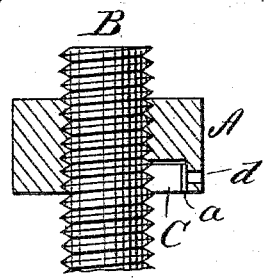
Figure 4:
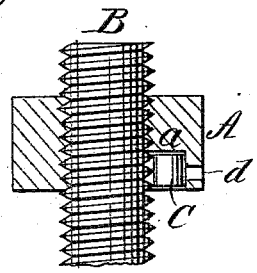

For the purpose of releasing the dog the nut is formed with a hole, $d$, at one side entering recess $a$, through which a key, $e$, is to be inserted, as illustrated in Fig. 4, and the dog pressed back with the key into the wider portion of the recess. The nut may then be turned backward.

Figure 5:
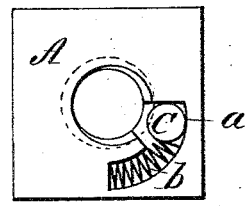
Figure 6:
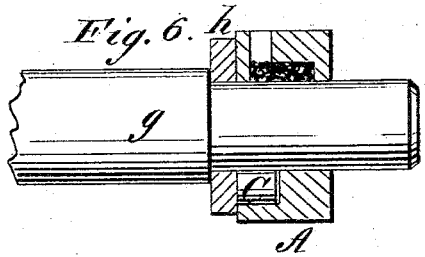

In the section, Fig. 5, and plan, Fig. 6, a dog C is shown in the form of a roller, or cylindrical. This form is adapted for use with a lever, a treadle, or a ratchet-drill, as illustrated in Fig. 7, in which $g$ may represent the shaft to be turned, having the nut applied at one end, and a washer, $h$, used to cover the recess $a$. The under side of the nut is recessed and contains a coiled spring, $i$, around the central flange of a washer, $k$. The spring is attached at one end to the nut and at the other to the washer, and the latter has holes in its sides for insertion of a key, $l$. The washer is to be turned with the key to wind the spring before the nut is tightened, and the nut afterward tightened upon the washer, so that the spring remains under tension, and the washer being held by a pin, $m$, the spring will act to tighten the nut whenever there is any looseness.

By the construction described I provide for the secure locking of nuts against backward movement, and at the same time provide for their being rapidly tightened.

Having thus described my invention, I claim as new and desire to secure by Letters Patent—

1. In lock-nuts, the combination of a dog or block, and a spring, acting on the dog, with a nut having an inclined recess, whereby the dog is pressed against the surface of the bolt, substantially as shown and described.

2. The combination, with a nut having a recess, $a$, of dog C and spring $b$, substantially as described.

GENERAL W. SAMPSON.

Witnesses:
CHARLES GILDEA,
EZEKIEL HENDRYX.